United States Patent [19]
Herb

[11] Patent Number: 4,602,902
[45] Date of Patent: Jul. 29, 1986

[54] EXPANSION DOWEL ASSEMBLY

[75] Inventor: Armin Herb, Peissenberg, Fed. Rep. of Germany

[73] Assignee: Hilti Aktiengesellschaft, Furstentum, Liechtenstein

[21] Appl. No.: 390,949

[22] Filed: Jun. 22, 1982

[30] Foreign Application Priority Data

Jun. 24, 1981 [DE] Fed. Rep. of Germany ....... 3124823

[51] Int. Cl.[4] .............................................. F16B 13/06
[52] U.S. Cl. ........................................ 411/45; 411/60; 411/65
[58] Field of Search .................. 411/44, 45, 46, 47, 411/48, 49, 50, 53, 55, 57, 60, 64, 65, 66, 67, 68

[56] References Cited

U.S. PATENT DOCUMENTS

| | | | |
|---|---|---|---|
| 777,399 | 12/1904 | Church | 411/55 |
| 839,705 | 12/1906 | Bennett | 411/68 |
| 943,906 | 12/1909 | Zifferer | 411/50 |
| 3,200,693 | 8/1965 | Dickow | 411/53 X |
| 3,623,396 | 11/1971 | Mortensen | 411/46 |
| 3,739,684 | 6/1973 | Vitkevich | 411/49 |
| 4,088,054 | 5/1978 | Lippacher et al. | 411/57 |

FOREIGN PATENT DOCUMENTS

| | | | |
|---|---|---|---|
| 7126482 | 3/1972 | Fed. Rep. of Germany. | |
| 2651930 | 6/1977 | Fed. Rep. of Germany | 411/49 |
| 2748631 | 5/1979 | Fed. Rep. of Germany | 411/55 |
| 2900698 | 7/1980 | Fed. Rep. of Germany | 411/57 |
| 3042463 | 5/1982 | Fed. Rep. of Germany | 411/57 |
| 1339663 | 9/1963 | France | 411/55 |
| 148673 | 1/1955 | Sweden | 411/60 |
| 1166262 | 10/1969 | United Kingdom | 411/60 |
| 2033524 | 5/1980 | United Kingdom | 411/57 |
| 642529 | 1/1979 | U.S.S.R. | 411/60 |

Primary Examiner—Thomas J. Holko
Attorney, Agent, or Firm—Toren, McGeady, Stanger, Golderg & Kiel

[57] ABSTRACT

An expansion dowel assembly includes an axially elongated sleeve having a leading end and a trailing end, an axially extending spreading member located within the sleeve adjacent its leading end, and a threaded bolt extending into the trailing end and toward the leading end of the sleeve. The threaded bolt is axially movable within the sleeve between a first position where the dowel assembly can be inserted into the borehole and a second position where the bolt is driven further into the sleeve into expanding contact with the spreading member for radially expanding the spreading member and the sleeve. An abutment is provided for the leading end of the dowel assembly to prevent displacement of the spreading member out of the sleeve when the bolt is driven from the first position toward the second position.

13 Claims, 7 Drawing Figures

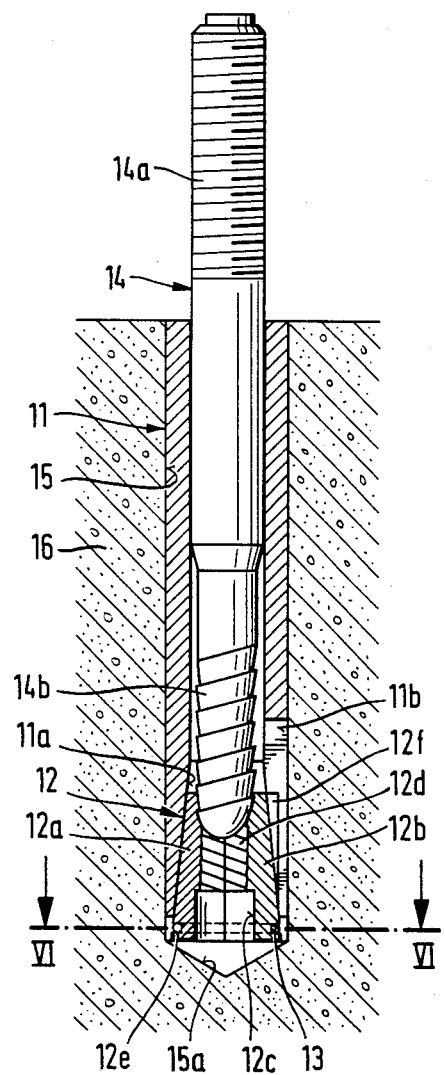
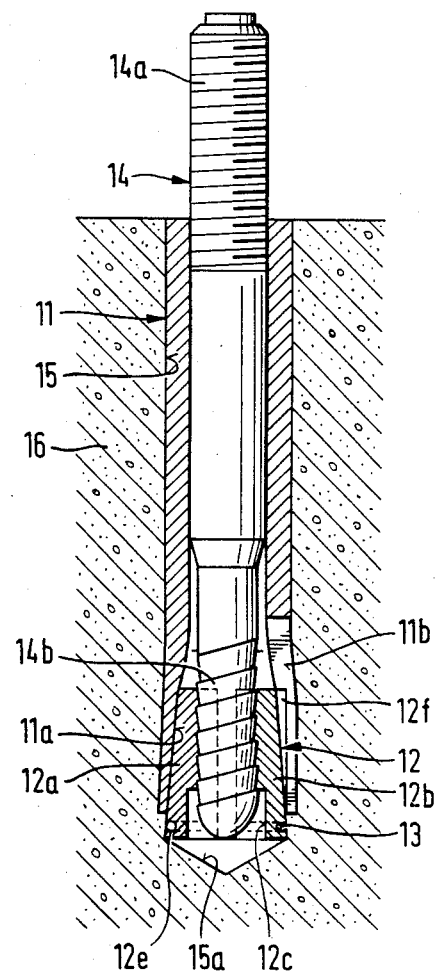
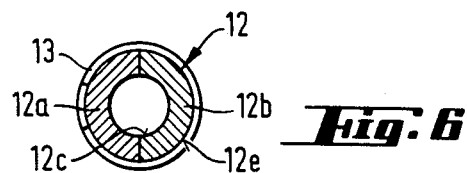

EXPANSION DOWEL ASSEMBLY

SUMMARY OF THE INVENTION

The present invention is directed to an expansion dowel assembly for insertion into a borehole and it includes a sleeve slit along at least a part of its length, a frusto-conically shaped spreading member and a threaded bolt for expanding the spreading member radially outwardly so that, in turn, the sleeve is radially expanded.

Dowels of the above-mentioned type are expanded by screwing a threaded bolt into the spreading member. As the spreading member moves relative to the threaded bolt it radially expands the sleeve within which it is located. When the expansion dowel assembly is stressed pulling the bolt out of the borehole, the spreading member is similarly pulled into the sleeve by the bolt and an after-spreading effect is achieved. Accordingly, the expansion of the assembly and the subsequent attachment of a load on the bolt tends to withdraw the spreading member out of the sleeve under an increasing load or stress until limited value is reached.

Such dowel assemblies have a substantial disadvantage in that screwing the threaded bolt into the spreading member consumes considerable energy and time.

For uses which require no after-spreading, it has been known to radially expand the sleeve by driving in a spreading element. In such a dowel assembly the spreading element can be a so-called screw nail. Such a screw nail has a saw-tooth like thread formed so that the nail can be driven into the dowel, but also can be screwed out if it is necessary.

Therefore, the primary object of the present invention is to provide an expansion dowel assembly by which the dowel sleeve can be radially expanded when the bolt is driven into the spreading element and also to afford an after-spreading effect.

In accordance with the present invention, an abutment is provided for the spreading members preventing the spreading members from being displaced out of the leading end of the sleeve when the bolt is driven into the sleeve into contact with the spreading member.

When the expansion dowel assembly is being secured within a borehole, as the threaded bolt is driven toward the leading end of the dowel sleeve, the spreading member is secured against displacement by means of the abutment. Accordingly, the spreading member cannot be pushed out of the leading end of the sleeve when the threaded bolt is driven forwardly through the sleeve. Holding the spreading member in place is necessary so that the expanding contact between the threaded bolt and the spreading member can take place. The abutment prevents movement in one direction only, however, so that the spreading member is not tightly connected to the sleeve. When a force is applied to the threaded bolt tending to pull it out of the anchored dowel assembly, the spreading member is connected to the bolt and moves with it in the direction opposite to that in which the threaded bolt was originally driven into the dowel assembly affording further expansion of the sleeve. Therefore, the after-spreading effect is not impaired by the abutment.

In a simple and preferred embodiment of the present invention, the abutment is formed by the base of the borehole into which the dowel assembly is to be anchored. Accordingly, the depth of the borehole must match the length of the expansion dowel assembly being used. The dowel assembly is introduced into the borehole until the leading end of the spreading member bears against the base of the borehole with the leading end of the spreading member extending from the leading end of the sleeve.

In certain applications, such as in hollow building blocks, it is not possible or advisable to provide the dowel assembly with the same axial length as the borehole. In such cases it is preferable to form the abutment on the sleeve. When the abutment is formed as part of the sleeve, it prevents the spreading member from falling out of the leading end of the sleeve and becoming lost before the expansion dowel assembly is inserted into the borehole.

The abutment can be formed in a number of ways. In one advantageous embodiment the abutment is formed as lugs on the sleeve which hold the spreading member in place. The lugs can grip the leading end of the spreading member or they can engage with a shoulder located on the trailing end of the spreading member. Another advantage gained by using such lugs is that the lugs can engage in grooves on the spreading member and prevent any rotation of the spreading member relative to the sleeve. When assembling the spreading member on the sleeve, the lugs can be bent in a simple manner for connecting the spreading body with the sleeve.

When the threaded bolt is driven into expanding contact with the spreading member, considerable axial forces are developed which must be absorbed by the abutment. To prevent any consequent deformation of the abutment, it is advisable if the abutment is formed as a radially inwardly directed shoulder. Such a shoulder can be formed by flanging the leading end of the sleeve. Based on the manner on which the sleeve is formed, the spreading member can be inserted into the sleeve from the trailing end or it can be inserted from the leading end with a subsequent inward flanging of the shoulder for securing the spreading member in place. The spreading member must be radially expandable when the threaded bolt is driven into the sleeve. Further, the spreading member should be capable of returning to its original state after the threaded bolt is removed so that the expansion dowel assembly can be removed from the borehole. To achieve this feature, the sleeve should be formed as one piece. The deformability of the sleeve can be attained by providing it with one or more radially and axially extending slits.

In another embodiment of the invention, to achieve optimum expansion, the spreading member can be formed of multiple parts. By using multiple parts, a uniform expansion of the spreading member over its entire circumference can be achieved. The individual parts can be held together by encircling spring rings or similar members. As a result, a radial spring-back or resilience of the spreading member is achieved and, at the same time, the loss of individual parts is prevented. To assure a friction-type connection between the threaded bolt and the spreading member, a thread corresponding to the one on the bolt must be formed in the spreading member. Such a thread can be pre-formed in the spreading member or it can be produced by the driving-in action of the bolt.

In principle, the sleeve can be formed by rolling a piece of sheet metal forming a constant wall thickness member. Such a sleeve, however, results in non-uniform spreading of the sleeve during expansion of the spreading member within the sleeve. In such an arrangement the maximum spreading action takes place at the leading end of the sleeve. If the sleeve is being placed in a borehole formed in a hard receiving material, it is possible that the trailing part of the sleeve does not come in contact with the surface of the borehole. To obtain a uniform expansion of the sleeve it is advisable if the axially extending opening through the sleeve widens toward the leading end in the region where the spreading member is located. When the spreading member and the surface of the opening in the sleeve have the same frusto-conical form, a cylindrical expansion of the sleeve is effected and a uniform spreading or expanding pressure is achieved over a larger area.

When the threaded bolt is driven into the spreading member, axial forces are introduced into the sleeve if the abutment forms a part of the sleeve. To prevent the sleeve from being pushed into the borehole when the threaded bolt is driven in, it is advantageous if the sleeve has an outwardly directed flange formed on its trailing end. With such an arrangement, the sleeve can be supported by means of the flange on the opening into the borehole or on the surface of the component to be fastened by the dowel assembly. The flange can be formed so that it does not project beyond the circumferential periphery of the sleeve when the sleeve is in its original state. The shank of the threaded bolt can be provided with an annular bead or ring which expands the sleeve so that the flange projects outwardly beyond the circumferential periphery of the sleeve. With this arrangement, the flange acts as an axial stop when the expansion dowel assembly is inserted through the hole in the component to be fastened to the receiving material. When the threaded bolt is driven in, however, the ring or bead is displaced and the sleeve returns to its original shape with the flange moving radially inwardly so that it no longer projects outwardly from the diameter of the borehole. This assures that the axial forces acting on the expansion dowel assembly are not borne by the sleeve but by a shoulder on the threaded bolt which bears against the component to be secured to the receiving material, thus permitting an after-spreading effect.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 5 is a third embodiment of an expansion dowel assembly embodying the present invention showing the assembly into a borehole in the pre-expanded state;

FIG. 6 is a cross-sectional view of the expansion dowel assembly taken along line IV—IV in FIG. 5; and FIG. 7 is a view, similar to that in FIG. 5, however, showing the expansion dowel assembly in the expanded state.

DETAIL DESCRIPTION OF THE INVENTION

Figure 1:
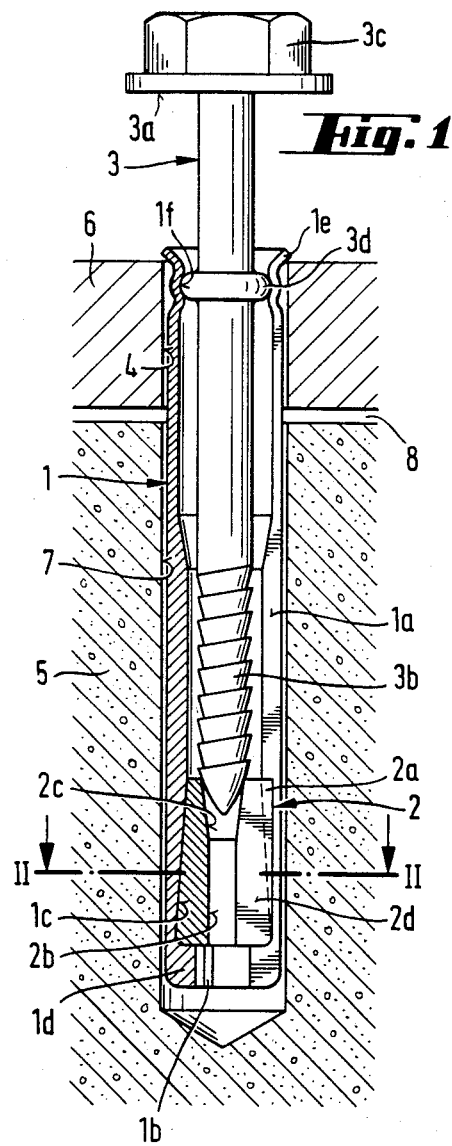
FIG. 1 is an axially extending sectional view of an expansion dowel assembly, embodying the present invention, and illustrated in the pre-expanded state.

In FIG. 1 the expansion dowel assembly is shown inserted into a borehole 7 formed in a receiving material 5. The assembly and each of its parts has a leading end and a trailing end with the leading end being that portion first inserted into the borehole. The dowel assembly includes an axially elongated sleeve 1, an axially extending spreading member 2 located within the sleeve adjacent its leading end, and a threaded bolt 3 extending through the trailing end of the sleeve toward its leading end. As can be seen in FIG. 1, sleeve 1 has an axially extending slit 1a extending from its leading end to its trailing end and slits 1b spaced angularly from the slit 1a extending in the axial direction from the leading end and for a portion of the axial length of the sleeve. An axially extending opening 1c is formed by the sleeve and in the region of the sleeve holding the spreading member, the surface of the opening diverges toward the leading end. At its leading end, however, a radially inwardly directed shoulder or flange 1d is provided covering a part of the opening leading to the leading end of the sleeve. Shoulder 1d acts as an abutment preventing the spreading member 2 from being displaced axially through the leading end of the sleeve when the threaded bolt 3 is driven toward the leading end of the sleeve from the position shown in FIG. 1. At its trailing end, sleeve 1 has a radially outwardly directed flange 1e. Flange 1e serves as a "depth" stop when the sleeve is inserted through the opening 4 in the component 6 which is to be fastened to the surface of the receiving material 5 in which the borehole 7 is formed. The flange 1e projects outwardly beyond the opening 4 preventing the sleeve from moving inwardly through the opening in the component 6. Further, the diameter of the opening 4 corresponds substantially with the diameter of the borehole 7 in the receiving material 5. As a result, the expansion dowel assembly including the sleeve 1 can be introduced into the borehole 7 of the receiving material 5 to which the component 6 is to be fastened.

The outer axially extending surface of the spreading member 2 is frusto-conically shaped corresponding to the frusto-conical shape of that portion of the opening 1c in which the spreading member is seated. A cam 2a projects radially outwardly from the outer surface of the spreading member and extends into the axially extending slit 1a preventing any relative rotation between the spreading member 2 and the sleeve 1. As can be seen in FIG. 1, the cam 2a extends axially along the outside surface of the spreading member. Further, a centrally arranged passageway 2b is located within the spreading member extending between its leading and trailing ends. The rear portion of the passageway 2b extending forwardly from the trailing end of the spreading member 2, is frusto-conically shaped with its surfaces converging in the direction toward the leading end of the spreading member. The frusto-conical portion 2c affords a centering action for the threaded bolt 3 when it is driven into the spreading member. Forwardly of the frusto-conical portion 2c, the passageway 2b is cylindrically shaped.

Threaded bolt 3 has a cap-like head at its trailing end and the head has a flange-like shoulder 3a arranged to bear against the surface of the component 6 in securing the component on the receiving material 5. Extending from its leading end for a portion of its axial length, the threaded bolt has a thread 3b. Thread 3b has a serrated or saw-tooth-like profile which permits the threaded bolt to be driven into the passageway 2b through the spreading member 2. The cap-like head on the bolt 3 has surfaces 3c engageable by a tool for rotating the threaded bolt about its axis. Accordingly, the threaded bolt can be screwed further into the spreading member 2 or, if necessary, it can be screwed out of the spreading member. As can be seen in FIG. 1, the axially extending opening through the sleeve has a cylindrically shaped section extending rearwardly from the frusto-conically shaped section containing the spreading member and then the opening flares outwardly from the cylindrical section to another cylindrical section extending rearwardly toward the trailing edge. The diameter of the shank of the bolt between the leading and trailing end is such that it is spaced inwardly from the surface of the opening through the sleeve. An annular bead or ring 3d is formed on the shank of the bolt 3. Bead 3d engages within an annular groove 1f formed in the interior surface of the sleeve adjacent its trailing end. The locking engagement of the bead 3d in the groove 1f provides two functions. First, the threaded bolt 3 and the sleeve 1 are held together as a pre-assembled unit when the dowel assembly is inserted into the borehole 7 in the receiving material 5. Second, the interengagement of the bead and the groove expands the trailing end part of the sleeve radially outwardly so that the flange 1e projects laterally beyond the edge of the opening 4 in the component 6. In placing the expansion dowel assembly into the borehole 7 in the receiving material 5, the assembly is inserted into the borehole until the flange 1e bears against the outwardly facing surface of the component 6 to be secured to the receiving material 5. In this position, as it is shown in FIG. 1, the threaded bolt is then driven into the sleeve 1 with its threaded end 3b moving forwardly into the frusto-conical portion 2c of the spreading member until the flange-like shoulder 3a on the bolt bears against the outwardly facing surface of the component 6. Any open spaces or gaps 8 located between the component 6 and the adjacent surface of the receiving material 5 can be eliminated by screwing the threaded bolt into the spreading member. The screwing action can be effected by engaging the surfaces 3c on the head of the bolt with a tool for rotating the threaded bolt about its axis.

Figure 2:
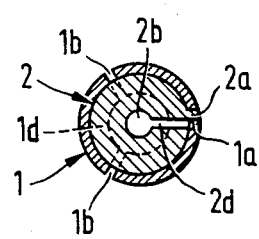
FIG. 2 is cross-sectional view of the expansion dowel assembly in FIG. 1 taken along the line II—II.

In the cross-sectional view shown in FIG. 2, the sleeve 1 is shown having a pair of slits 1b extending through it. The slits 1b are spaced angularly apart from one another and from the slit 1a. The cam 2a on the spreading member projects outwardly into the slit 1a. The interengagement of the cam 2a in the slit 1a prevents relative rotation between the sleeve 1 and the spreading member 2. Passageway 2b is shown centered in the spreading member 2. To facilitate its radial expandability, the spreading member 2 has a radially extending slit 2d extending radially outwardly from the passageway 2b to the outside surface of the spreading member.

Figure 3:
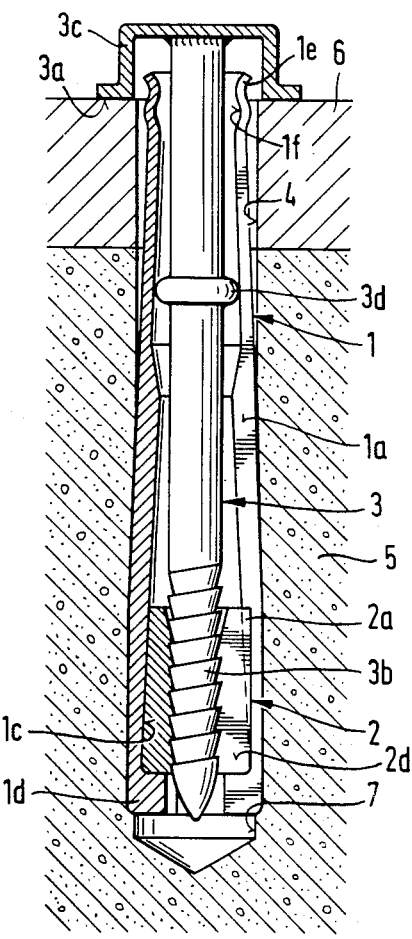
FIG. 3 is a view, similar to FIG. 1, of the expansion dowel assembly, however, illustrating the dowel in the expanded state.

In FIG. 3 the threaded bolt 3 is shown after it has been driven into the spreading member 2 and the flange-like shoulder 3a is in bearing contact with the outwardly facing surface of the component 6 fastened to the receiving material 5. Due to the movement of the threaded bolt 3 into the spreading member 2 its thread 3b has formed a corresponding thread in the passageway 2b through the spreading member. As the leading end of the threaded bolt moves forwardly through the spreading member 2, it radially expands the spreading member and the sleeve 1 forcing the sleeve outwardly into anchoring engagement with the surface of the borehole 7. As the threaded bolt 3 is driven forwardly through the spreading member the shoulder 1d at the leading end of the sleeve 1 prevents the spreading member from moving out of the sleeve. As the bolt 3 is driven into the sleeve 1 and the spreading member 2, the bead 3d is disengaged out of the groove 1f and the trailing end of the sleeve 1 springs back into its original condition, note FIG. 3 as compared to FIG. 1. As a result, the outside diameter of the flange 1e is smaller than the diameter of the opening through the component 6. Accordingly, it is ensured that any forces acting on the component opposite to the direction in which the threaded bolt is driven into the sleeve, are absorbed by the shoulder 3a on the bolt and not by the flange 1e on the sleeve 1. Thus if the component tends to displace the bolt 3 out of the borehole 7 an after-spreading takes place as the bolt in engagement with the spreading member 2, pulls the spreading member in the direction toward the trailing end of the sleeve 1. Such movement toward the trailing end of the sleeve effects an after-spreading of the dowel assembly. The gap 8 shown in FIG. 1 between the surface of the receiving material 5 and the adjacent surface of the component 6 is eliminated in FIG. 3 by driving in the threaded bolt or by an additional tightening of the bolt into the spreading member 2. As can be seen in FIG. 3 the cap-like head on the bolt provides an annular open space so that the cap can move relative to the trailing end of the sleeve, that is, the trailing end of the sleeve can telescope into the cap-like head on the bolt. If necessary, threaded bolt 3 can be screwed out of the spreading member 2 by gripping the surfaces 3c on the bolthead and rotating the bolt about its axis so that it is backed out of the spreading member. If forces are applied to the threaded bolt 3 in a direction opposite to the driving-in direction, the spreading member is pulled toward the trailing end of the sleeve and because of the corresponding configurations of the inside surface of the sleeve and of the spreading member a further radial expansion of the sleeve is effected.

Figure 4:
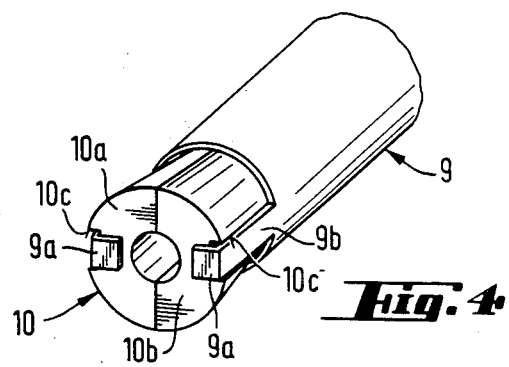
FIG. 4 is a perspective view of another embodiment of the present invention.

In FIG. 4 another embodiment of the expansion dowel assembly is illustrated. In this embodiment the expansion dowel assembly includes an axially extending sleeve 9 and a spreading member 10. Spreading member 10 is made up of two halves 10a, 10b. The trailing end of the spreading member 10 fits into the leading end of the sleeve 9 and the leading end of the spreading member 10 is located forwardly of the leading end of the sleeve. The spreading member 10 is secured in the sleeve 9 by two lugs 9a bent inwardly over the leading end of the spreading member. Webs 9b secured to the leading end of the sleeve 9 extend forwardly into engagement with the lugs so that the combination of the lugs 9a and webs 9b hold the spreading member in the leading end of the sleeve 9. Further, the webs 9b are located within axially extending grooves 10c in the outside surface of the spreading member. The interengagement of the webs 9b and the grooves 10c prevents relative rotation between the spreading member and the sleeve and also secures the spreading member halves 10a, 10b together. When a threaded bolt is driven into the spreading member 10, lugs 9a form the abutment which prevents the spreading member 10 from being displaced out of the leading end of the sleeve 9.

Another expansion dowel assembly is shown in FIGS. 5, 6 and 7 and includes an axially elongated sleeve 11, and a spreading member 12 inserted into the leading end of the sleeve. As indicated in FIG. 6, the spreading member 12 is made up of two halves 12a, 12b held together adjacent the leading end of the spreading member by a spring ring or clip 13. Sleeve 11 has an axially extending opening 11a extending between its leading end and trailing end and a portion of the opening extending from the leading end is frusto-conically shaped with the larger diameter at the leading end so that the surface within the opening converges inwardly from the leading end toward the trailing end. The frusto-conical portion of the opening extends for only an axial part of the sleeve with the remainder of the opening 1a being cylindrically shaped to the trailing end of the sleeve. A threaded stud or bolt 14 is inserted through the sleeve from the trailing end toward the leading end. The expansion dowel assembly is inserted as a unit into the borehole 15 formed in the receiving material 16 so that the length of the borehole corresponds to the length between the leading end of the spreading member 12 and the trailing end of the sleeve 11.

An axially extending part of the threaded bolt from its trailing end is provided with a thread 14a onto which a nut can be engaged for securing a component or member to the surface of the receiving material 16. Extending from the leading end of the threaded bolt 14 is a so-called saw-tooth thread 14b. The shape of the thread 14b makes it possible to drive the threaded bolt 14 into the spreading member 12. Spreading member 12 has a through passageway 12c extending from its trailing end to its leading end with a portion of the passageway from the trailing end containing saw-tooth thread 14b. In contrast to the single so-called saw-tooth thread 14b on the bolt 14, the threads 12d in the spreading member 12 are multiple threads so that a finely adjustable locking engagement is possible between the threaded bolt 14 and the spreading member 12. To assure that the spring ring 13 does not interfere with the insertion of the spreading member 12 into the sleeve 11, the ring is located within a recess 12e in the circumferential surface of the spreading member halves 12a, 12b. To prevent any relative rotation between the spreading member 12 and the sleeve 11 when the bolt 14 is tightened, the spreading member has a lug 12f extending in the axial direction on its outside surface and engaging within an axially extending slit 11b in the sleeve 11.

As shown in FIG. 5, the expansion dowel assembly is inserted into the borehole 15 until the leading end of the spreading member 12 contacts the base 15a of the borehole. Accordingly, base 15a in the borehole 15 forms an abutment for the spreading member 12 when the threaded bolt is driven in so that the spreading member cannot be displaced out of the leading end of the sleeve 11.

In the cross-sectional view of the expansion dowel assembly displayed in FIG. 6, the two halves 12a, 12b of spreading member 12 can be noted. The spreading member halves 12a, 12b are held together radially by spring ring 13 located in the recess 12e. Further, FIG. 6 illustrates the through passageway 12c within the spreading member into which the bolt 14 can be driven.

In FIG. 7 the expansion dowel assembly of FIG. 5 is in the expanded state with the threaded bolt 14 driven forwardly through the spreading member 12a causing the radial expansion of the spreading member and the sleeve 11. As the sleeve 11 and spreading member 12 are radially expanded, the sleeve is anchored within the borehole 15. The axially extending opening 11a in the sleeve 11 is frusto-conically shaped at the leading end of the sleeve and the outside surface of the spreading member 12 is similarly frusto-conically shaped so that a practically cylindrical spreading of the sleeve 11 takes place as the bolt 14 is driven into the spreading member. Since spreading member 12 is supported against the base 15a of the borehole 15 only when the threaded bolt is driven into the spreading member, the spreading member can move in the opposite direction relative to the sleeve when a pulling action is effected on the bolt so that an after-spreading effect is attained.

The bolt 15 is cylindrically shaped from its trailing end to a frusto-conical section located between its trailing and leading ends. Forwardly of the frusto-conical section, the bolt has a reduced diameter extending to its leading end and the threads 14b are formed in this reduced diameter section. The cylindrical section of the bolt has a diameter corresponding to the inside diameter of the sleeve adjacent its trailing end.

While specific embodiments of the invention have been shown and described in detail to illustrate the application of the inventive principles, it will be understood that the invention may be embodied otherwise without departing from such principles.

I claim:

1. Expansion dowel assembly for insertion into a borehole formed in a receiving material, comprising an axially elongated sleeve having a leading end arranged to be inserted first into the borehole and a trailing end, said sleeve having a slit therein extending from the leading end for at least a part of the axial length of the sleeve for affording the radial expandability thereof, an axially extending radially expandable spreading member located in said sleeve adjacent the leading end thereof, said spreading member having a leading end and a trailing end spaced apart in the axial direction thereof, a part of the axially extending inside surface of said sleeve converging inwardly in the direction from the leading end toward the trailing end, an axially elongated bolt having a leading end and a trailing end positioned within said sleeve and being axially displaceable relative to said sleeve between a first position where the dowel assembly is in the pre-expanded position and can be inserted into a borehole and a second position where the leading end of said bolt is displaced in the axial direction into said sleeve toward the leading end thereof into expanding engagement with said spreading member for radially expanding said spreading member and said sleeve, the leading end of said bolt having an axially extending thread-like profile, wherein the improvement comprises that said spreading member has an axially extending passageway therein extending from the trailing end thereof toward the leading end and arranged to be contacted by the leading end of said bolt with the maximum diameter of said passageway being less than the maximum diameter of said bolt adjacent the leading end thereof, abutment means connected to said sleeve for preventing said spreading member from being displaced axially out of the leading end of said sleeve when said bolt is displaced axially from the first position toward the second position into expanding engagement with said spreading member, said thread-like profile being shaped so that said bolt can be driven axially by an impact action thereon from the first position toward the second position through said spreading member and after being driven through and expanding said spreading member can be screwed relative to said spreading member in the direction toward the leading end of said sleeve and toward the trailing end of said sleeve, said sleeve has a flange formed monolithically on the trailing end thereof with said flange arranged to extend radially outwardly beyond the outside surface of said sleeve, displaceable means for retaining said flange radially outwardly beyond the outside surface of said sleeve whereby said flange can be deflected radially inwardly when said means are displaced and do not maintain said flange radially outwardly, and said thread-like configuration on the leading end section of said bolt comprises a saw-tooth like thread.

2. Expansion dowel assembly, as set forth in claim 1, wherein said abutment means are formed on the leading end of said sleeve.

3. Expansion dowel assembly, as set forth in claim 2, wherein said abutment means comprises lugs engaging said spreading member.

4. Expansion dowel assembly, as set forth in claim 3, wherein said lugs include axially extending webs secured to and extending axially outwardly from the leading end of said sleeve, said lugs located at the ends of said webs spaced outwardly from the leading end of said sleeve, said lugs being bent radially inwardly transversely of the axial direction of said sleeve, the trailing end of said spreading member is located within said sleeve and the leading end of said spreading member is spaced axially outwardly from the leading end of said sleeve, and said lugs disposed into engagement with said leading end of said spreading member.

5. Expansion dowel assembly, as set forth in claim 2, wherein said abutment means comprises a flange-like part formed on the leading end of said sleeve with said flange-like part projecting inwardly toward the center of said sleeve, said flange-like part forming a shoulder extending radially inwardly from the inside surface of said sleeve for securing said spreading member within said sleeve.

6. Expansion dowel assembly, as set forth in any one of claims 1, 2, 3, 4 or 5, wherein said spreading member is a unitary member.

7. Expansion dowel assembly, as set forth in any one of claims 1, 2, 3, 4 or 5, wherein said spreading member is formed of a multiple number of separate axially extending parts.

8. Expansion dowel assembly, as set forth in any of 1, 2, 3, 4 or 5, wherein said passageway within said sleeve extends through said sleeve and adjacent the leading, end of said sleeve is frusto-conically shaped with the surface of the frusto-conically shaped section converging inwardly in the direction from the leading end toward the trailing end of said sleeve.

9. Expansion dowel assembly, as set forth in claim 1, wherein said means for retaining said flange comprises that said sleeve has an annular groove in the inside surface thereof adjacent the trailing end with the groove encircling said bolt and said bolt having an annular bead extending around said bolt at a position spaced from the trailing end of said bolt and in the first position said bead is in locking engagement within the groove in said sleeve for preventing relative axial movement between said sleeve and said bolt and for expanding said flange at the trailing end of said sleeve radially outwardly.

10. Expansion dowel assembly, as set forth in any one of claims 1, 2, 3, 4, or 5, wherein said spreading member has a cam on the outside surface thereof, said sleeve has an axially extending slit extending from the leading end thereof toward the trailing end, and said cam being secured within said slit for preventing relative rotation between said sleeve and said spreading member.

11. Expansion dowel assembly, as set forth in claim 1 wherein said bolt having a cap-like head secured to the trailing end of said bolt and forming an annular open space between said cap-like head and the shank of said bolt at the trailing end thereof.

12. Expansion dowel assembly, as set forth in claim 1, wherein said passageway extends through said spreading member with a portion of the axial passageway extending from the trailing end of said spreading member being threaded to receive the thread on said bolt and said thread on said bolt being a single thread and said thread in said spreading member being a multiple thread.

13. Expansion dowel assembly, as set forth in claim 1, wherein said abutment means being positioned out of the axial path of displacement of said bolt as said bolt is displaced from the first to the second position so that the bolt does not contact said abutment means.

* * * * *